US009721300B2

(12) United States Patent
Markov et al.

(10) Patent No.: US 9,721,300 B2
(45) Date of Patent: Aug. 1, 2017

(54) SYSTEMS AND METHODS FOR FINANCIAL OPTIMIZATION USING PORTFOLIO CALIBRATION

(75) Inventors: Michael Markov, Short Hills, NJ (US); Evgeny Bauman, Summit, NJ (US)

(73) Assignee: MARKOV PROCESSES INTERNATIONAL, LLC, Summit, NJ (US)

( * ) Notice: Subject to any disclaimer, the term of this patent is extended or adjusted under 35 U.S.C. 154(b) by 158 days.

(21) Appl. No.: 12/476,564

(22) Filed: Jun. 2, 2009

(65) Prior Publication Data

US 2009/0307149 A1 Dec. 10, 2009

Related U.S. Application Data

(60) Provisional application No. 61/059,587, filed on Jun. 6, 2008.

(51) Int. Cl.
*G06Q 40/00* (2012.01)
*G06Q 40/06* (2012.01)

(52) U.S. Cl.
CPC ............ *G06Q 40/06* (2013.01); *G06Q 40/00* (2013.01)

(58) Field of Classification Search
CPC ......... G06Q 40/00; G06Q 40/06; G06Q 10/06
USPC .................... 705/35, 36 R, 40, 44
See application file for complete search history.

(56) References Cited

U.S. PATENT DOCUMENTS 6,003,018 A 12/1999 Michaud et al.
6,928,418 B2 * 8/2005 Michaud et al. ........... 705/36 R
7,174,381 B2 * 2/2007 Gulko et al. .................. 709/226
7,412,414 B2 * 8/2008 Michaud et al. ........... 705/36 R
7,624,060 B2 * 11/2009 Michaud et al. ........... 705/36 R
2003/0177240 A1 * 9/2003 Gulko et al. .................. 709/226
2003/0195831 A1 10/2003 Feldman
2004/0083150 A1 * 4/2004 Michaud et al. ............... 705/36
2005/0096950 A1 * 5/2005 Caplan et al. .................... 705/7
2005/0273414 A1 * 12/2005 Michaud et al. ............... 705/36
2006/0129447 A1 * 6/2006 Dockery et al. ............... 705/10

(Continued)

OTHER PUBLICATIONS

Markowitz, H.M. (Mar. 1952). "Portfolio Selection". The Journal of Finance 7 (1): 77-91.*

(Continued)

*Primary Examiner* — Kelly Campen
(74) *Attorney, Agent, or Firm* — Fay Kaplun & Marcin, LLP (57) ABSTRACT

Investment portfolios undergo a calibration procedure to improve their efficiency and stability. Any set of portfolios could be selected for calibration. If said portfolios represent a result of a portfolio optimization or asset allocation, then using original model inputs, an optimization procedure is performed to compute an original efficient frontier and a set of frontier portfolios is selected for calibration. A plurality of random samples of modified optimization inputs based on the original inputs is generated. For each random sample of inputs a modified efficient frontier is computed using the portfolio optimization model with modified inputs. Each portfolio selected for calibration is projected on the modified efficient frontier to create a corresponding modified calibration portfolio. Calibrated portfolio is created by averaging its calibrations. Calibrated efficient frontier is created by averaging all calibration portfolios for each selected portfolio on the original frontier.

10 Claims, 3 Drawing Sheets

(56) References Cited

U.S. PATENT DOCUMENTS

| | | | |
|---|---|---|---|
| 2007/0271547 A1* | 11/2007 | Gulko et al. | 717/106 |
| 2008/0288420 A1* | 11/2008 | Michaud et al. | 705/36 R |
| 2009/0070275 A1* | 3/2009 | Frank et al. | 705/36 T |
| 2009/0157563 A1* | 6/2009 | Serbin et al. | 705/36 R |
| 2009/0281959 A1* | 11/2009 | Abidi et al. | 705/36 R |
| 2009/0307149 A1* | 12/2009 | Markov et al. | 705/36 R |
| 2010/0076908 A1* | 3/2010 | Frank | 705/36 T |

OTHER PUBLICATIONS

Markowitz, H.M. (1959). Portfolio Selection: Efficient Diversification of Investments. New York: John Wiley & Sons. http://cowles.econ.yale.edu/P/cm/m16/index.htm.*

Jobson et al, "Estimation for Markowitz, Efficient Portfolios", Journal of the American Statistical Association, vol. 75, No. 371, Sep. 1980, pp. 544-554.

DiBartolomeo, "Portfolio Optimization: The Robust Solution", PSQC, Dec. 21, 1993, 8 sheets.

Liang et al., "The Bootstrap Efficient Frontier for Mixed-Asset Portfolios", Real Estate Economics, vol. 24, pp. 247-256, 1996.

Markowitz, "Portfolio Selection, Efficient Diversification of Investments", Yale University Press, pp. 129-154.

Michaud, "Efficient Asset Management, A Practical Guide to Stock Portfolio Optimization and Asset Allocation", Harvard Business School Press, pp. 40-67.

Michaud, "The Markowitz Optimization Enigma: Is Optimized Optimal?", Financial Analysts Journal, Jan.-Feb. 1989, pp. 31-42.

Jorion, "Portfolio Optimization in Practice", Financial Analysts Journal, Jan.-Feb. 1992, pp. 68-74.

\* cited by examiner

Graph 300

SYSTEMS AND METHODS FOR FINANCIAL OPTIMIZATION USING PORTFOLIO CALIBRATION

PRIORITY

This application claims priority to U.S. Provisional Application No. 61/059,587, filed on Jun. 6, 2008 entitled "Systems and Method for Financial Optimization Using Portfolio Calibration", the specification of which is expressly incorporated, in its entirety, herein.

BACKGROUND OF THE INVENTION

Optimization models are widely used in finance where they are employed primarily in two major portfolio-based applications: Asset Allocation models and Portfolio Construction models. The Asset Allocation models are used to create major strategic allocations for an investment portfolio, such as a pension fund with one or more broad market segments (e.g., equity, fixed income, real estate, cash, etc). The Portfolio Construction models are used to create portfolios consisting of specific securities having very specific implementation constraints and objectives, such as trading efficiency, purchase constraints, etc.

Results generated by the models are typically represented graphically on one or more Efficient Frontier charts, which may simply be line graphs plotted on x-axis (risk) and y-axis (return). With the introduction of mean variance optimization ("MVO") by Markowitz in early 1950's, it became apparent to practitioners that asset allocation and portfolio optimization procedures frequently produce results that are not practical. Specifically, the results were not diversified enough and tend to relatively overweigh assets having small asset variance and large mean return estimates. Furthermore, the results are not robust, wherein they are very sensitive to measurement error in input parameters such as estimates of asset return means and variance-covariance matrix. Thus, a small change in input parameters could lead to a dramatic shift in both the efficient frontier and efficient allocations.

SUMMARY

The present invention is generally related to systems and methods for calibrating the efficiency of portfolios for financial optimizations. One exemplary embodiment is related to a method comprising defining a portfolio optimization model, the model including at least one model parameter, determining original inputs for the model, performing an optimization procedure on each of the at least one model parameter to compute an original efficient frontier, selecting one or more portfolios from the original efficient frontier for calibration, generating a plurality of random samples of optimization inputs based on the original inputs, computing a current efficient frontier using the portfolio optimization model with the optimization inputs, thereby generating a plurality of optimal portfolio sets, calibrating each of the one or more selected portfolios of the original efficient frontier to create a corresponding calibration portfolio for each selected portfolio, wherein the calibrating includes projecting the selected portfolios onto the current efficient frontier, averaging each of the calibration portfolios for each of the selected portfolios of the original efficient frontier, and creating a calibrated efficient frontier report.

A further exemplary embodiment is related to a computer readable storage medium including a set of instructions executable by a processor, the set of instructions operable to: define a portfolio optimization model, the model including at least one model parameter, determine original inputs for the model, perform an optimization procedure on each of the at least one model parameter to compute an original efficient frontier, select one or more portfolios from the original efficient frontier for calibration, generate a plurality of random samples of optimization inputs based on the original inputs, compute a current efficient frontier using the portfolio optimization model with the optimization inputs, thereby generating a plurality of optimal portfolio sets, calibrate each of the one or more selected portfolios of the original efficient frontier to create a corresponding calibration portfolio for each selected portfolio, wherein the calibrating includes projecting the selected portfolios onto the current efficient frontier, average each of the calibration portfolios for each of the selected portfolios of the original efficient frontier, and create a calibrated efficient frontier report.

A further exemplary embodiment is related to a system, comprising a defining means defining a portfolio optimization model, the model including at least one model parameter, a determining means determining original inputs for the model, a performing means performing an optimization procedure on each of the at least one model parameter to compute an original efficient frontier, a selecting means selecting one or more portfolios from the original efficient frontier for calibration, a generating means generating a plurality of random samples of optimization inputs based on the original inputs, a computing means computing a current efficient frontier using the portfolio optimization model with the optimization inputs, thereby generating a plurality of optimal portfolio sets, a calibrating means calibrating each of the one or more selected portfolios of the original efficient frontier to create a corresponding calibration portfolio for each selected portfolio, wherein the calibrating includes projecting the selected portfolios onto the current efficient frontier, an averaging means averaging each of the calibration portfolios for each of the selected portfolios of the original efficient frontier, and a creating means creating a calibrated efficient frontier report.

A further exemplary embodiment is related to a system for financial optimization using portfolio calibration, comprising a memory arrangement for storing data, and a processor defining a portfolio optimization model, the model including at least one model parameter, the processor determining original inputs for the model, the processor performing an optimization procedure on each of the at least one model parameter to compute an original efficient frontier, the processor selecting one or more portfolios from the original efficient frontier for calibration, the processor generating a plurality of random samples of optimization inputs based on the original inputs, the processor computing a current efficient frontier using the portfolio optimization model with the optimization inputs, thereby generating a plurality of optimal portfolio sets, the processor calibrating each of the one or more selected portfolios of the original efficient frontier to create a corresponding calibration portfolio for each selected portfolio, wherein the calibrating includes projecting the selected portfolios onto the current efficient frontier, the processor averaging each of the calibration portfolios for each of the selected portfolios of the original efficient frontier and creating a calibrated efficient frontier.

DETAILED DESCRIPTION

The present invention may be further understood with reference to the following description and the appended drawings, wherein like elements are referred to with the same reference numerals. The present invention relates to systems and methods for calibrating the efficiency of portfolios for financial optimizations. According to the exemplary embodiments of the present invention, each portfolio on the Markowitz efficient frontier may undergo a user-controlled calibration procedure in order to make it more robust (e.g., less sensitive) to changes in input parameters. Accordingly, the goal of such a calibration is to provide a modification to the portfolio so that it remains as close as possible to being efficient despite potential measurement error in optimization inputs. Thus, the exemplary systems and methods described herein are flexible and allows a user to adjust the direction of such calibration based on the user's risk aversion to potential changes in economic scenarios.

A distinguishing feature of an exemplary calibration procedure is that the procedure not limited to calibrating efficient portfolios that are the result of an MVO or a similar portfolio optimization procedure. In other words, the calibration procedure makes it possible to calibrate any portfolio whether it is a current allocation of an investor assets or any prospective allocation of assets under consideration.

Furthermore, the exemplary embodiments of the present invention create a new measure of portfolio stability that reflects sensitivity of a portfolio's efficiency due to disturbance of input parameters. Accordingly, this measure be used by an investor is to compare various prospective allocations with respect to their potential stability, or instability, and may further be used to judge (e.g., ascertain) the stability of the current allocation, thereby potentially avoiding unnecessary reallocation of assets.

In many cases, investors use optimization approach, such as an MVO, to obtain an efficient portfolio based on certain capital market assumptions (e.g., risk and return expectations) and certain investor preferences. Once such efficient portfolio is allocated, the market situation may deviate from what was expected, and the portfolio may not attain the desired risk/return results. Thus, the efficient portfolio will lose its efficiency status. Accordingly, it is presumed that rational investors are looking to improve the efficiency of portfolios in changing economic environment.

The exemplary embodiments of the present invention provide portfolio calibration procedures designed to modify portfolio weights so that its efficiency is less sensitive to random changes in input parameters. As will be described in greater detail below, these portfolio calibration procedures may be used in the creation of a calibrated efficient frontier report. One of methods used traditionally in statistics to solve similar problems is to employ a Monte Carlo simulation technique. In such a method, a large number of data sets statistically similar to the original set of data are randomly generated and statistical estimates are derived based on simulated sets of data.

As will be described in greater detail below, an exemplary calibration process may start with defining a portfolio optimization model and determining optimization inputs. The model may be a classic asset allocation model, such as an MVO, requiring estimates of means and covariances of assets in consideration. Other asset allocation models may be considered, such as downside risk optimization, benchmark tracking optimization, etc. In addition, some portfolio optimization models may employ non-quadratic objective functions, extensive use of constraints, as well as taking in consideration transaction costs. Accordingly, a portfolio optimization model may have one or more user-defined parameters such as risk-tolerance thus making it a parametric model.

As inputs, the above-described optimization models may utilize time series of asset characteristics, such as historical (e.g., daily, weekly, monthly, etc.) asset returns. In the alternative, or additionally, these optimization models may utilize estimates based on times series or obtained elsewhere, such as, for example, economists' forecast of expected asset performance (e.g., expected returns and risks) and/or their co-movement (e.g., expected correlations or similar).

The result of optimization procedure may represent a parametric set of optimal portfolios, wherein each portfolio may be defined by asset weights corresponding to certain values of parameters. An example of such a set is Markowitz' Efficient Frontier, where efficient portfolios correspond to certain values of the risk tolerance. This frontier may be an Original Efficient Frontier, as it is based on the original (e.g., not disturbed) input parameters. The exemplary method may proceed by generating a large number of random samples of optimization inputs, namely random scenarios. These random samples may be generated, for example, by using a parametric Monte-Carlo method or by using a re-sampling procedure such as bootstrap or jackknife.

According to the exemplary embodiments of the present invention, the method may then apply the same optimization procedure to each generated set of inputs. For each of the random scenarios, a set of optimal portfolios, such as an Efficient Frontier, may be obtained. Therefore, the result may be a number of optimal portfolio sets, corresponding to inputs generated on each Monte Carlo path or random scenario. Thus, if Markowitz' MVO is used as the model, there may be a large number of Efficient Frontiers corresponding to expected returns and covariances generated for each random scenario.

A calibration may then be performed on the Original Efficient Frontier. A key element of an exemplary calibration procedure may be finding, for every portfolio from the original frontier, a corresponding portfolio (e.g., a calibration) on each frontier from the randomly generated scenarios. For example, each individual portfolio from the original frontier may be referred to as "individual portfolio P", while the corresponding calibration may be referred to as "calibrated p*". Therefore, calibrated P* may be defined of individual portfolio P based on certain scenarios (e.g., randomly generated optimization inputs) as its projection on the efficient frontier corresponding to the scenario. Thus, such a projection could be a portfolio on the efficient frontier that has, for example, the same return as the individual portfolio P but lowest risk, the same risk as individual portfolio P but highest return, or being the closest portfolio on the frontier to individual portfolio P in a certain metric, or any other projection. Accordingly, the investor may have control over the projection process, which reflects investor's risk aversion to random changes in economic inputs. For example, if the investor is risk averse to such changes, he/she may always select to have having the lowest risk for the same level of return as the individual portfolio P.

This calibration procedure may be repeated for each individual portfolio P (or for a representative sample) on the original frontier and thus create a Calibrated Efficient Frontier report. Thus, the Calibrated Efficient Frontier report may contain average calibrated portfolios P* corresponding to each portfolio on the original frontier. It is expected that portfolios on the newly created frontier, by design, may be more diversified than the original portfolios and may provide more efficient and stable results when optimization inputs are randomly disturbed.

According to an alternative embodiment of the system and methods described herein, any given portfolio that is not on the efficient frontier may be calibrated. Specifically, it may be determined whether the portfolio resides in a confidence region of the new frontier. Furthermore, the portfolio may be subjected to a visual stress-test by displaying a cloud of "future-efficient portfolios" corresponding to all Monte Carlo scenarios (e.g., based on risk, return or both). Thus, a decision as to whether there is a need to modify the existing allocation could be based on its position versus the cloud.

Figure 1:
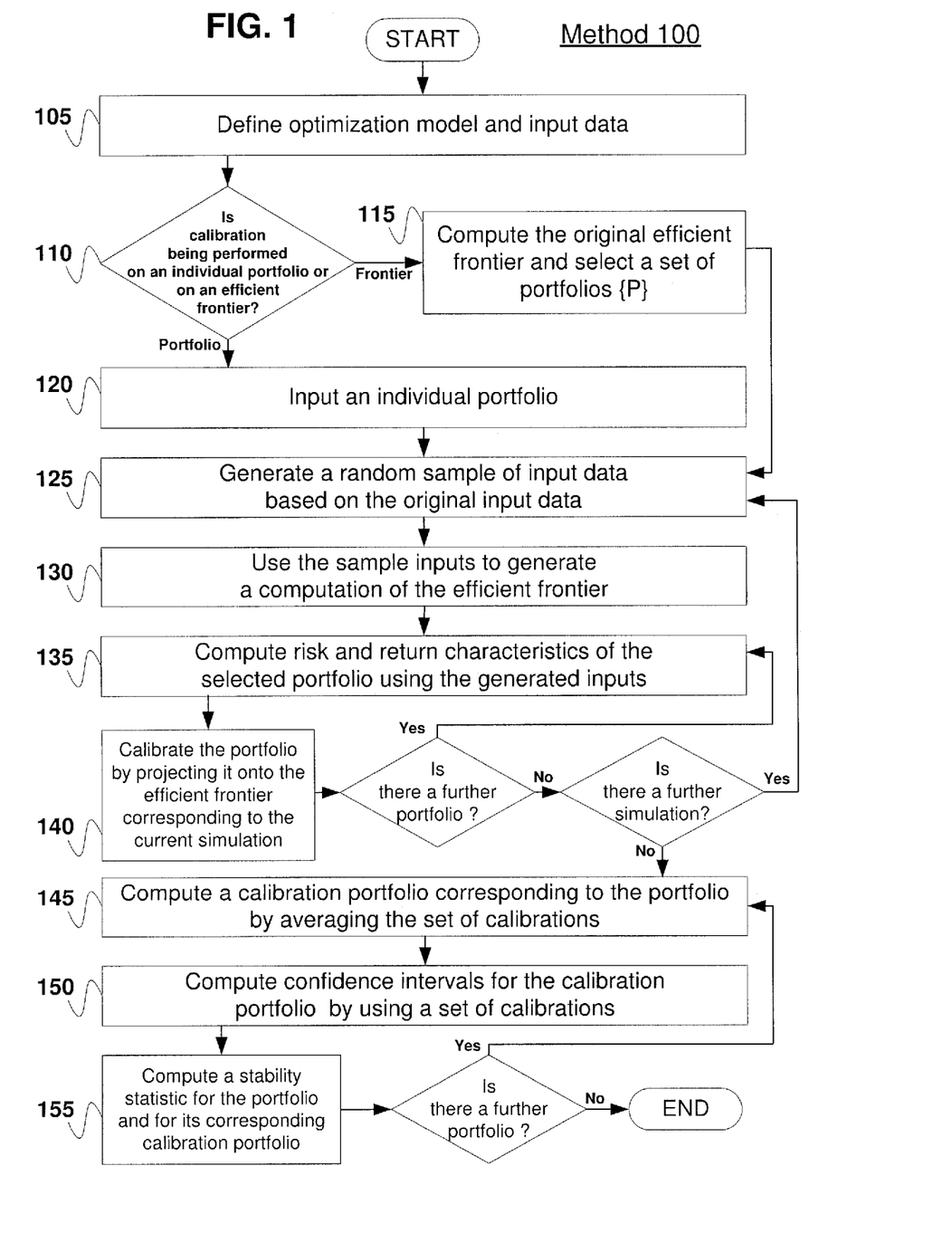
FIG. 1 shows an exemplary embodiment of a method for calibration of portfolios on the efficient frontier according to the present invention.

FIG. 1 shows an exemplary embodiment of a method 100 for calibration of portfolios on the efficient frontier according to the present invention. In step 105, the method 100 may define an optimization model setup, such as, for example, objective function(s), constraints, distribution assumptions, parameters, etc. Accordingly, different models may require different inputs for the original input data. For a Mean-Variance Optimization (MVO) setup with assets, the following inputs are typically used:

a vector of asset expected returns $m=(m_1, \ldots, m_k)$ and a covariance matrix [k×k] of assets $C=|c_{ij}, i,j=1, \ldots, k|$.

Alternative optimization models may require different asset statistics. Furthermore, certain optimization models may use time series of asset returns directly as the input data.

In step 110, the method 100 may determine whether the calibration is being performed on an individual portfolio or on an efficient frontier. If the calibration is of an individual portfolio, the method 100 may advance to step 120. However, if the calibration is of an efficient frontier, the method 100 may advance to step 115.

In step 115, the method 100 may compute the original efficient frontier. Specifically, an optimization procedure may be performed for each value of the model parameters and a corresponding parametric set of optimal portfolios $\Phi=\{P_{OPT}\}$ may be obtained. For instance, $P=(p_1, \ldots, p_k)$ may be a portfolio, where $p_1, \ldots, p_k$ are allocations to assets. Accordingly, the mean value of portfolio's return may be calculated as follows:

$$E(P) = \sum_{i=1}^{k} p_i m_i,$$

wherein the risk of portfolio is measured by its variance $$\sigma^2(P) = \sum_{i=1}^{k} \sum_{j=1}^{k} c_{ij} p_i p_j.$$

The MVO model may be formulated as an optimization problem seeking to minimize a portfolio risk for various levels of mean return or to maximize a portfolio mean return for various level of risk. In such case, either return or risk value could serve as a parameter and the set $\Phi$ is a set of optimal portfolios corresponding to various values of return/risk in a range. Alternatively, MVO may be frequently formulated as a parametric model having risk tolerance as the parameter.

Figure 2:
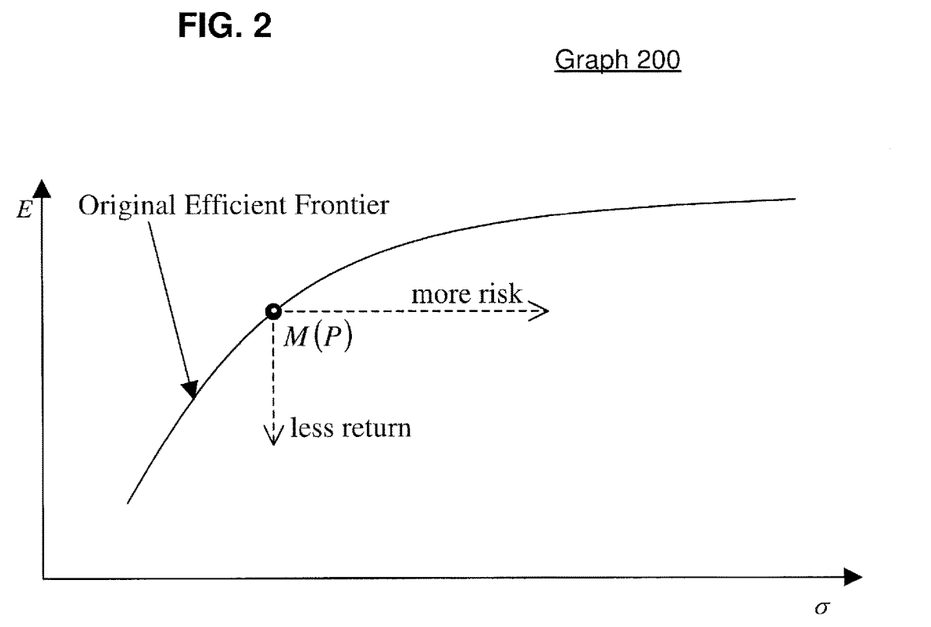
FIG. 2 shows an exemplary graph of the original Efficient Frontier according to the present invention.

FIG. 2 shows an exemplary graph 200 of the original Efficient Frontier according to the present invention. Specifically Markowitz' efficient frontier $\Phi=\{P_{OPT}\}$ is frequently presented graphically as a 2-dimensional plot of points $M(P)=(\sigma(P);E(P))$ on graph 200, where each portfolio is deemed efficient in the sense that one cannot find a portfolio with less risk and more return than any efficient portfolio given model's inputs and constraints. Since original (and not randomly modified) optimization inputs may be used to construct such a frontier, the frontier in graph 200 may be described as the Original Efficient Frontier.

For calibration, a subset $\{P\} \subseteq \Phi$ of points may be selected on the original efficient frontier. For example, such selection may be based on a certain range and step increment of portfolio statistics, such as standard deviation, mean return, etc. Once the original efficient frontier is computed and the subset of portfolios $\{P\}$ is selected from the frontier for calibrations, the method 100 may advance to step 125.

In step 120, the method 100 may input an individual portfolio into the optimization model. As the calibration method 100 may be applicable to any portfolio, it is not limited to calibrating portfolios on the efficient frontier. In other words, any portfolio of assets can be selected for calibration. At this step 120, asset weights of a portfolio may be inputted. Accordingly, this portfolio may constitute a single-element set $\{P\}$. It should be noted that the following steps 125 and 130 of the method 100 may be performed for a plurality of simulations.

In step 125, the method 100 may generate a random sample of input data based on the original input data. As described above, a Monte Carlo procedure may be performed in order to generate random input data (e.g., simulation) that is statistically similar to the original optimization inputs. In addition, this simulation step may be repeated for a sufficiently large number of times in order to obtain a statistically representative sample of inputs. For example, the simulation may be repeated for a specific number of times, T.

It may be presumed that this step 125 starts with a certain distribution type (e.g., that asset returns have joint normal, log-normal, or any other distribution). For example, if MVO model is using asset expected return means and covariance estimates as inputs, then these inputs may be used to generate random means and covariances. Alternatively, if the assumption is that asset returns are jointly normally distributed with given covariance and means, a time series of asset returns of a certain size may be generated from the multivariate normal distribution with given parameters. Accordingly, such generated time series of returns may then be used to estimate a new set of optimization inputs (e.g., means and covariances).

Alternatively, such inputs may be generated directly, without generating time series of asset returns. Thus, a vector of random asset means may be generated from multivariate normal distribution defined by the original inputs (e.g., means and the covariance matrix). Furthermore, a random covariance matrix may be generated using a Wishart distribution.

As a result of such T-th simulation we obtain the following random inputs: $m_T=(m_{T,1}, \ldots, m_{T,k})$ and the covariance matrix as $C_T=\|c_{T,ij}, i,j=1, \ldots, k\|$.

As an alternative to Monte Carlo technique above, bootstrap and/or jackknife methods may be used to generate a random sample of asset returns, wherein these methods may not utilize distribution assumptions. In these methods, a subset of original asset returns time series may be generated by either drawing a random sample or creating a truncated sample by sequentially removing a certain number (e.g., one or more) of consecutive observations (e.g., with replacement).

In step 130, the method 100 may use the sample inputs of step 125 in order to generate a computation of the efficient frontier $\Phi_T = \{P_{OPT}\}_T = \{(P_{T,1}, \ldots, P_{T,k})\}$. Specifically, the same optimization model that was used in computation of the original frontier may be applied to the inputs generated on the previous step 125. Due to the fact that the optimization inputs are different from the original inputs, the resulting efficient set of portfolios is different from the original set, but it is optimal given new inputs.

It should be noted the following steps 135 and 140 may be performed for a plurality of portfolios in the selected set {P}. Specifically, the calibration steps may be performed for each portfolio selected for calibration, regardless of whether the portfolio is on the original efficient frontier or an individual portfolio with supplied asset allocations.

In step 135, the method 100 may compute risk and return characteristics (e.g., coordinates) of the selected portfolio P using the inputs generated in step 125. Specifically, on this step, certain statistics of the portfolio selected for calibration may be computed using the inputs randomly generated in step 125. For example, a mean return $E_T(P)$ and a variance $\sigma_T^2(P)$ of portfolio P corresponding to asset means and covariance matrix generated on T-th simulation may be computed as follows:

$$E_T(P) = \sum_{i=1}^{k} p_i m_{T,i}, \sigma_T^2(P) = \sum_{i=1}^{k} \sum_{j=1}^{k} c_{T,ij} p_i p_j$$

In step 140, the method 100 may calibrate the portfolio P. Specifically, the portfolio P may be projected onto the efficient frontier $\Phi_T$ from step 130 corresponding to the current simulation, e.g., assign a portfolio $P_T$ on the frontier from step 130 to portfolio P using one or more of the characteristics computed in step 135. In other words, the step 140 may consist of defining a correspondence between portfolios on the original frontier, selected in step 130, and portfolios on T-th simulated frontier (see FIG. 3).

Figure 3:
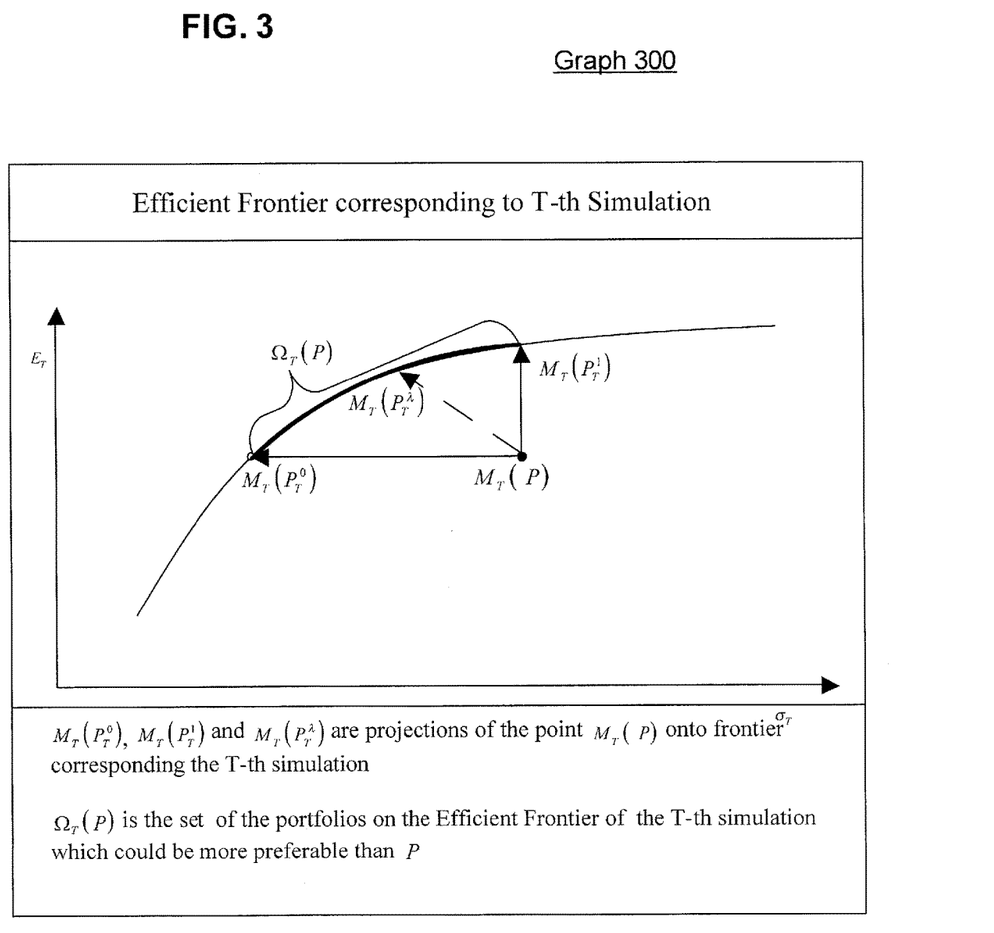
FIG. 3 shows an exemplary graph of the Efficient Frontier corresponding to T-th Simulation according to the present invention.

FIG. 3 shows an exemplary graph 300 of the Efficient Frontier corresponding to T-th Simulation according to the present invention. It is possible that portfolio $P=(p_1, \ldots, p_k)$ is not efficient given the new inputs and the point $M_T(P)$ in the risk-return plane with coordinates $(\sigma_T(P); E_T(P))$ does not belong to the efficient frontier given simulated on step T inputs.

The graph 300 of FIG. 3 may be traced in order to locate a portfolio that is preferred to P. Such a portfolio can be represented, for example, either by $P_T^0$ (which may have the same expected return and minimum risk), or by portfolio $P_T^1$ (which may have the same risk and the maximum expected return). Accordingly, both portfolios $P_T^0$ and $P_T^1$ belong to the T-th efficient frontier. Based on the given current inputs, portfolios $P_T^0$ and $P_T^1$ may be described as preferred to portfolio P and they could have been used instead of P if there was a perfect foresight. Moreover each portfolio on the T-th efficient frontier located between portfolios $P_T^0$ and $P_T^1$ may be preferred to portfolio P (e.g., the set $\Omega_T(P)$ on the graph 300 of FIG. 3).

According to the exemplary method 100, calibration portfolio $P_T = P_T(P)$ may denote a general quantitative rule (e.g., a function) as to how a preferred portfolio is determined from the set $\Omega_T(P)$, given current simulated data. The calibration of portfolio $P_T$ on the T-th simulation may be achieved by performing a projection of the portfolio P to the T-th efficient frontier using, but not limited to, the following Options:

1. $P_T^0$ which has the minimum risk on the entire frontier set $\Phi_T$ while its expected return $E_T(P_T^0)$ is not less than that of the portfolio P.
2. $P_T^1$ which has maximum return on the entire frontier set $\Phi_T$ while its risk $\sigma_T(P_T^1)$ is not greater than that of the portfolio P.
3. $P_T^\lambda$ between $P_T^0$ and $P_T^1$ above.
   First, we define a "projection statistics" S(P) such as risk, return, etc. It is assumed that S(P) is a monotonic function of portfolios along the T-th efficient frontier. The number $0 \le \lambda \le 1$ is fixed. We then determine a portfolio $P_T^\lambda$ on the T-th efficient frontier such that $S(P_T^\lambda) = (1-\lambda)S(P_T^0) + \lambda S(P_T^1)$. In extreme cases, if $\lambda=0$ then $P_T^\lambda = P_T^0$, and if $\lambda=1$ then $P_T^\lambda = P_T^1$
4. $P_T^*$ where $M_T(P_T^*) \in \Omega_T(P)$ and $$(M_T(P_T^*) - M_T(P))^2 = \min_{M_T(P_T) \in \Omega_T(P)} (M_T(P_T) - M_T(P))^2$$

In another words, the method 100 may choose the nearest point of the set $\Omega_T(P_O)$ to the point $M_T(P)$ in Euclidian norm in the risk-return coordinates.

Therefore, the process of calibration may be controlled by the investor preference. Thus, a risk-averse investor would prefer calibration Option 1 above, which may significantly limit his/her investment options but would result in portfolios with more stable risk efficiency.

An alternative calibration method $P_T = P_T(P)$ in step 140 may include finding a portfolio $P_T^* = (p_{T,k}^*, \ldots, P_{T,k}^*)$ on the frontier $\Phi_T$ which is closest in a certain norm to $P=(p_1, \ldots, p_k)$ in portfolio coordinates. Such a portfolio may satisfy the following condition $$\sum_{i=1}^{k} (p_{T,i}^* - p_i)^2 = \min_{P_T \in \Phi_T} \left[ \sum_{i=1}^{k} (p_{T,i} - p_i)^2 \right]$$

in Euclidian norm or $$\sum_{i=1}^{k} |p_{T,i}^* - p_i| = \min_{P_T \in \Phi_T} \left[ \sum_{i=1}^{k} |p_{T,i} - p_i| \right]$$

in absolute norm.

Once the portfolio P is calibrated in step 140, the method 100 may return to step 135 to compute the risk and return characteristics of a further selected portfolio. If there are no further selected portfolios, the method 100 may return to step 125 to generate a further random sample of input data based on a further simulation. If there are no further simulations, the method 100 may advance to step 145.

It should be noted that the following steps 145 and 155 of the method 100 may be performed for a plurality of portfolios in the selected efficient set {P}. In step 145, the method 100 may compute a calibration portfolio corresponding to portfolio P by averaging the set of calibrations from step 140. Specifically, for each portfolio $P=(p_1, \ldots, p_k)$ from the selected set of portfolios $\{P\}$, the method 100 may obtain the sequence of its projections $\{P_1, \ldots, P_N\}$. Accordingly, the average calibrated portfolio may be constructed by averaging allocations as follows:

$$P_{Calibrated} = \left\{ \sum_{T=1}^{N} w_T p_{T,1}, \ldots, \sum_{T=1}^{N} w_T p_{T,k} \right\}$$

Where $\{w_T\}$ may represent weights applied to each of the simulations. In the simplest case, all of the weights may be equal and the above formula may then be reduced to simple averaging as follows:

$$P_{Calibrated} = \left\{ \frac{1}{N} \sum_{T=1}^{N} p_{T,1}, \ldots, \frac{1}{N} \sum_{T=1}^{N} p_{T,k} \right\}$$

It should be noted that in more complex weighting, some of the weights in $\{w_T\}$ may be set to zero to remove outliers, etc. Thus, the calibration portfolios computed for portfolios from the original efficient frontier may constitute the Calibrated Efficient Frontier report.

In step 150, the method 100 may construct confidence intervals for the calibration portfolio weights. Specifically, the method 100 may compute confidence intervals for the calibration portfolio obtained in step 145 by using one of the set of calibrations obtained from step 140.

For instance, it may be that a certain significance level $\alpha$ such as $0 < \alpha < 1$. For example, $\alpha = 0.9$. For each asset $i = 1, \ldots, k$, the method 100 may perform the following steps:

1. Consider $p_{1,i}, p_{2,i}, \ldots, p_{N,i}$ representing i-th asset weight of each calibration $P_1, P_2, \ldots, P_N$ of the original efficient portfolio P.
2. Sort asset weights in an ascending order:

$$p_{(1),i} \leq p_{(2),i} \leq \ldots \leq p_{(N),i}.$$

3. Let $$s = \frac{(1-\alpha)N}{2}$$

rounded or truncated to an integer value

4. Determine $p_{i,low} = p_{(s),i}$ and $p_{i,up} = p_{(N-s),i}$ as low and upper bounds of a confidence interval for weights of the i-th asset in the portfolio.

In step 155, the method 100 may compute a stability statistic for portfolio P and for its corresponding calibration portfolio $P_T$. The portfolio stability statistic may be computed for any portfolio. Accordingly, it may be computed for both the selected portfolio P and its calibration portfolio $P_T$ to support in decision process of either accepting or rejecting calibration portfolio $P_T$ as an alternative to the portfolio P. This stability statistic may be defined as an average relative distance from a portfolio to its calibration portfolio computed across all calibrations computed in step 145. The distance may be defined in terms of portfolio allocation differences (e.g., turnover, Euclidean distance, etc.), risk measures (e.g., variance or standard deviation), return, Sharpe Ratio or any other similar statistic. Thus, a portfolio stability measurement may be used to determine how close the portfolio is to being efficient when random error is applied to optimization inputs.

In the following example portfolio allocations stability statistic may be calculated, wherein the portfolio allocations stability may measure average changes to portfolio allocations required to maintain its efficiency in various simulations. Accordingly, the distance between the original portfolio allocations and its projection on the T-th simulation may be computed as follows:

$$D_T(P) = \sqrt{\Sigma_{i=1}^{k}(p_{T,i} - p_i)^2},$$

if the distance is measured in Euclidean norm. If the distance is measured in absolute norm, the following measure of allocation stability may be used:

$$D_T(P) = \Sigma_{i=1}^{k} |p_{T,i} - p_i|$$

The method 100 may then compute the average of these values for all simulations as follows:

$$D(P) = \frac{1}{N} \sum_{T=1}^{N} D_T(P)$$

This measure of portfolio stability could be interpreted as the average modifications to portfolio allocations required to maintain its efficiency in various market conditions.

In the following example risk stability statistic may be calculated, wherein the risk stability statistic may measure stability of a portfolio's risk. Accordingly, the difference between the original variance of a portfolio P and its variance on the T-th simulation may be computed as follows:

$$\sigma_T^2(P) - \sigma_T^2(P_T)$$

This difference can be described as a penalty for considering P instead the optimal portfolio $P_T$, given T-th simulation. Similar to the Coefficient of Determination in regression analysis, the method 100 may define the following ratio:

$$R_T^2(P) = \frac{\sigma_T^2(P_T)}{\sigma_T^2(P)},$$

By definition, $R_T^2(P) \leq 1$. Thus, the closer this value is to 1.0, then the closer is the portfolio P to the efficient frontier on the T-th simulation. The method 100 may then compute the average of these values for all simulations as follows:

$$R^2(P) = \frac{1}{N} \sum_{T=1}^{N} R_T^2(P)$$

Therefore, $R^2(P)$ may be considered as a measure of risk stability of the portfolio P.

Once the stability statistic is computed for portfolio P and for the corresponding calibration portfolio in step 155, the method 100 may return to step 145 to compute the calibration portfolio a further selected portfolio. If there are no further selected portfolios, the method 100 may terminate.

The present invention has been described with reference to specific exemplary embodiments thereof. It will, however, be evident that various modifications and changes may be made thereto without departing from the broadest spirit and scope of the present invention as set forth in the disclosure herein. Accordingly, the specification and drawings are to be regarded in an illustrative rather than restrictive sense.

The invention claimed is:

1. A method, comprising:
   defining, by a processor, a portfolio optimization model the model including at least one model parameter;
   determining, by the processor, original inputs for the model;
   performing, by the processor, an optimization procedure on each of the at least one model parameter to compute an original efficient frontier;
   selecting, by the processor, one or more portfolios from the original efficient frontier for calibration;
   generating, by the processor, a plurality of random samples of optimization inputs based on the original inputs;
   computing, by the processor, a current efficient frontier using the portfolio optimization model with the optimization inputs, thereby generating a plurality of optimal portfolio sets;
   computing, by the processor, a current risk/return characteristic of the one or more selected portfolios using allocations of the one or more selected portfolios and the newly generated optimization inputs;
   calibrating, by the processor, each of the one or more selected portfolios of the original efficient frontier based on the computed current risk/return characteristic of the one or more selected portfolios to create a corresponding calibration portfolio for each selected portfolio, wherein the calibrating includes projecting the selected portfolios onto the current efficient frontier;
   averaging, by the processor, each of the calibration portfolios for each of the selected portfolios of the original efficient frontier; and
   creating, by the processor, a calibrated efficient frontier report.

2. The method of claim 1, further comprising:
   generating, by the processor, a further plurality of random samples of further optimization inputs based on the original inputs;
   computing, by the processor, a further efficient frontier using the portfolio optimization model with the further optimization inputs, thereby generating a further plurality of optimal portfolio sets;
   recalibrating, by the processor, each of the one or more selected portfolios of the original efficient frontier to create a further corresponding calibration portfolio for each selected original portfolio, wherein the recalibrating includes projecting the selected portfolios onto the further efficient frontier; and
   averaging, by the processor, each of the recalibration portfolios for each of the selected portfolios of the original efficient frontier; and
   creating, by the processor, a recalibrated efficient frontier report.

3. The method of claim 1, further comprising:
   computing, by the processor, one or more confidence intervals for each of the calibration portfolio based on an asset weight of each calibration portfolio.

4. The method of claim 1, further comprising:
   computing, by the processor, one or more stability statistic for at least one of the selected portfolios and the corresponding calibrated portfolio.

5. The method of claim 1, wherein the inputs include at least one of an asset return mean, a variance-covariance matrix, a time series of asset characteristics, an estimate based on expected asset performance, and an asset co-movement.

6. The method of claim 1, wherein the portfolio optimization model is an asset allocation model.

7. The method of claim 6, wherein the asset allocation model is one of a mean-variance optimization, a downside risk optimization, and a benchmark tracking optimization.

8. The method of claim 1, wherein the at least one model parameter includes risk tolerance.

9. The method of claim 1, wherein the generating a plurality of random samples of optimization inputs is performed using one of a Monte Carlo procedure, a bootstrap resampling procedure, and a jackknife resampling procedure.

10. A system for financial optimization using a portfolio calibration, comprising:
    a memory arrangement for storing data; and
    a processor defining a portfolio optimization model, the model including at least one model parameter,
    the processor determining original inputs for the model,
    the processor performing an optimization procedure on each of the at least one model parameter to compute an original efficient frontier,
    the processor selecting one or more portfolios from the original efficient frontier for calibration, the processor generating a plurality of random samples of optimization inputs based on the original inputs,
    the processor computing a current efficient frontier using the portfolio optimization model with the optimization inputs, thereby generating a plurality of optimal portfolio sets,
    the processor computing a current risk/return characteristic of the one or more selected portfolios using allocations of the one or more selected portfolios and the newly generated optimization inputs,
    the processor calibrating each of the one or more selected portfolios of the original efficient frontier based on the computed current risk/return characteristic of the one or more selected portfolios to create a corresponding calibration portfolio for each selected portfolio, wherein the calibrating includes projecting the selected portfolios onto the current efficient frontier,
    the processor averaging each of the calibration portfolios for each of the selected portfolios of the original efficient frontier and creating a calibrated efficient frontier.

* * * * *